(12) United States Patent
Maruo et al.

(10) Patent No.: US 7,003,270 B2
(45) Date of Patent: Feb. 21, 2006

(54) ELECTRONIC APPARATUS HAVING RADIO TRANSMITTER

(75) Inventors: Nobuhide Maruo, Kawasaki (JP);
Makoto Saotome, Kawasaki (JP);
Makoto Kotani, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 496 days.

(21) Appl. No.: 10/062,476

(22) Filed: Feb. 5, 2002

(65) Prior Publication Data

US 2003/0083025 A1    May 1, 2003

(30) Foreign Application Priority Data

Oct. 29, 2001   (JP) .............................. 2001-331106

(51) Int. Cl.
*H04B 1/04* (2006.01)
(52) U.S. Cl. ...................... 455/113; 455/260; 455/299; 375/327
(58) Field of Classification Search ................ 455/296, 455/297, 298, 299, 260, 310, 572, 127.1, 455/114.2, 110, 111, 112, 113, 102, 76; 375/302–308, 375/327; 331/2, 23, 47, 50, 53, 185; 327/156, 327/175
See application file for complete search history.

(56) References Cited

U.S. PATENT DOCUMENTS

| 4,190,882 A | * | 2/1980 | Chevalier et al. | ............. 363/26 |
|---|---|---|---|---|
| 4,373,206 A | * | 2/1983 | Suzuki et al. | ................ 455/103 |
| 4,654,882 A | * | 3/1987 | Ikeda | ........................... 455/88 |
| 4,814,770 A | * | 3/1989 | Reger | .......................... 342/175 |
| 4,977,611 A | * | 12/1990 | Maru | ....................... 455/161.2 |
| 5,103,321 A | * | 4/1992 | Amachi et al. | ............. 358/475 |
| 5,519,889 A | * | 5/1996 | Hipp | ......................... 455/297 |
| 5,594,735 A | * | 1/1997 | Jokura | ......................... 370/337 |
| 5,661,440 A | * | 8/1997 | Osaka | .......................... 331/16 |
| 6,246,864 B1 | * | 6/2001 | Koike | ........................ 455/110 |
| 6,459,885 B1 | * | 10/2002 | Burgess | ........................ 455/83 |

FOREIGN PATENT DOCUMENTS

| JP | 4-277934 | 10/1992 |
|---|---|---|
| JP | 5-315980 | 11/1993 |
| JP | 6-303772 | 10/1994 |
| JP | 10-313248 | 11/1998 |
| JP | 11-122123 | 4/1999 |

* cited by examiner

*Primary Examiner*—Sonny Trinh
*Assistant Examiner*—Sam Bhattacharya
(74) *Attorney, Agent, or Firm*—Westerman, Hattori, Daniels & Adrian LLP

(57) ABSTRACT

An electronic apparatus comprising a radio transmitter is disclosed. In a computer system (1) having a radio transmission circuit (3) of a phase modulation type supplied with power from a power supply (4) of a switching type, the switching frequency of the power supply (4) is determined based on the comparison frequency for the sampling operation of a PLL circuit (10) of the radio transmitter, thereby removing the power noises generated from the switching regulator of the radio transmitter of a phase modulation type.

2 Claims, 8 Drawing Sheets

ELECTRONIC APPARATUS HAVING RADIO TRANSMITTER

BACKGROUND OF THE INVENTION

1. Field of the Invention

The present invention relates to an electronic apparatus having a radio transmitter of a phase modulation type.

2. Description of the Related Art

Figure 8:
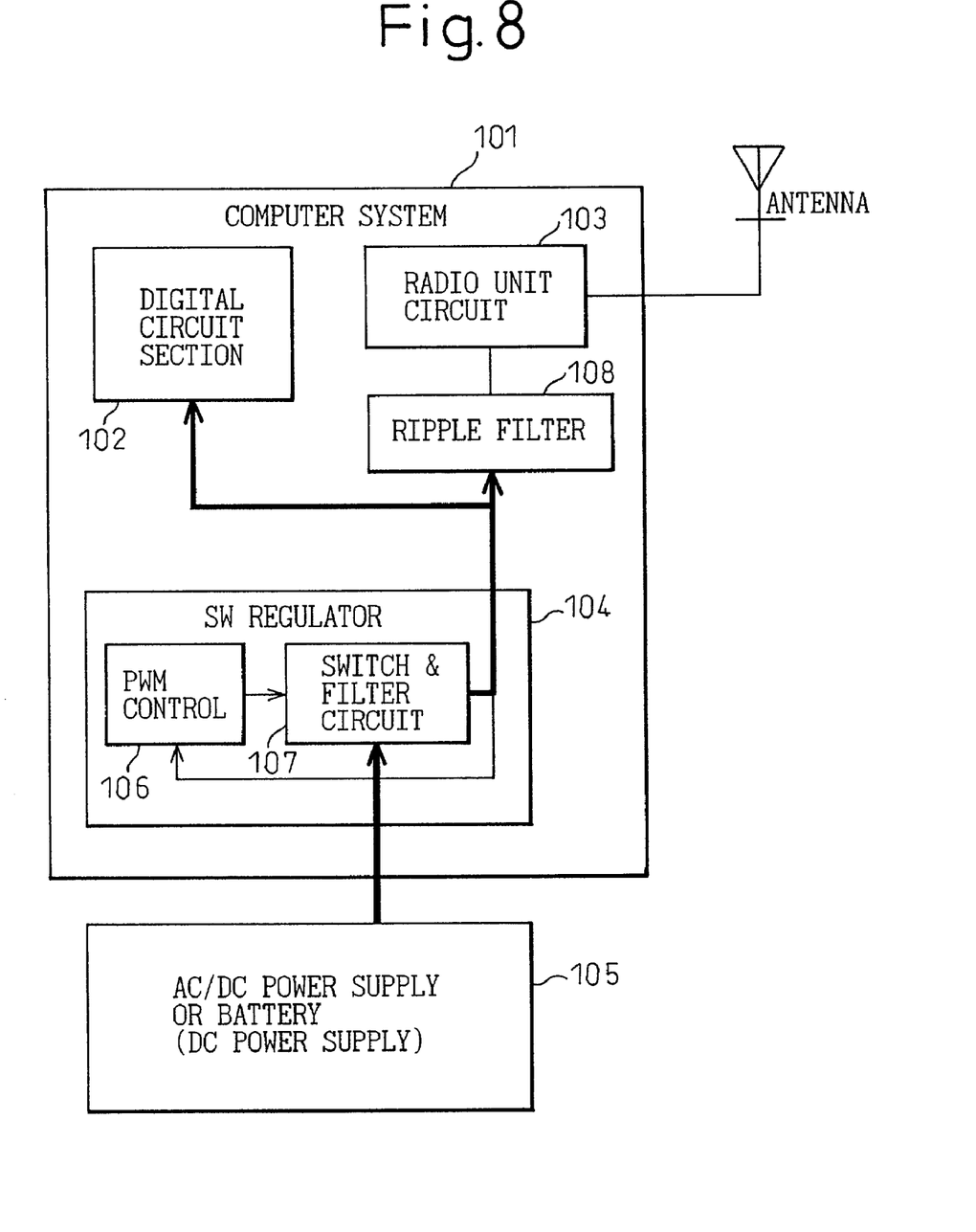
FIG. 8 is a block diagram showing a configuration of a conventional computer system having a radio transmitter built therein.

FIG. 8 is a block diagram showing a configuration of a conventional computer system having a radio transmitter built therein. In an electronic apparatus having a radio transmitter, such as a computer system 101 having the radio transmitter shown in FIG. 8 built therein, power noise, which is not of such a level as to pose any problem for a digital circuit section 102 including a low-frequency logic circuit of the computer system in the case where no radio unit is used, has a conspicuous effect on the characteristics of a radio unit circuit 103, constituting a high-frequency circuit section of the radio transmitter, in the case where the radio unit is used. Especially in a radio transmitter of a phase modulation type, power noise has an adverse effect on the modulation accuracy, and therefore a series regulator generating only a small noise is preferably used as the power supply of the radio transmitter.

In the case where the series regulator is used as a power supply, however, the power efficiency of the power supply is deteriorated to cause an increased power consumption. For this reason, a switching regulator 104 is generally used as a power supply. The switching (SW) regulator 104 includes a PWM control circuit 106 for controlling the pulse width of the output pulse generated from a high-frequency transmission circuit (not shown) based on a reference voltage in response to the DC power from an AC/DC power supply or a DC power supply 105 such as a battery, and a switching & filter circuit 107 having a LC filter for averaging the pulse train obtained by switching the DC voltage through a switching element. The voltage output from the switching & filter circuit 107 is fed back to the PWM control circuit 106 which, in turn, controls the pulse width in such a manner as to eliminate the difference between the feedback voltage and the reference voltage, with the result that the switching & filter circuit 107 outputs a stable DC voltage.

In a computer system having built therein a radio transmitter employing a switching regulator as a power supply, however, the switching regulator 104 generates a ripple (switching) noise of a high power and frequency. Once the ripple frequency of the noise generated from this power supply approaches the comparison frequency sampled by the PLL built in the radio circuit of a phase modulation type, the modulation accuracy of the radio transmitter is adversely affected. The problem, therefore, is that in order to reduce the ripple noise of the power supply and thereby to prevent the comparison frequency of the PLL from being adversely affected by the ripple noise, an expensive ripple filter 108 occupying a large physical space must be added in the power line.

Japanese Unexamined Patent Publication Nos. 11-122123 and 6-303772 disclose techniques for avoiding the effect of the ripple noise on the radio transmitter. The technique disclosed by the former patent publication is for changing over the switching frequency when the receiving frequency of the radio receiver coincides with the switching frequency of the switching regulator, and the technique disclosed by the latter patent publication concerns the technique for changing the switching frequency upon detection of the generation of a wave interfering with the radio receiver such as a TV tuner. These techniques relate to the radio receiver but not to the modulation accuracy of the radio transmitter of phase modulation type. Also, in both techniques, the switching frequency of the switching regulator is changed over from the initially set frequency to another frequency upon generation of a ripple noise.

SUMMARY OF THE INVENTION

The object of the present invention is to provide an electronic apparatus having a radio transmitter comprising a radio transmitter of a phase modulation type including no ripple filter, in which the reduction of the phase modulation accuracy of the radio transmitter can be prevented without changing over the switching frequency of the switching regulator for supplying power to the radio transmitter, free of the effects of the power noise generated from the switching regulator.

In order to achieve this object, according to one aspect of this invention, there is provided an electronic apparatus comprising a radio transmitter of a phase modulation type supplied with power from a power supply of a switching type, wherein the switching frequency of the power supply is based on the frequency of the radio transmitter.

According to another aspect of the invention, there is provided an electronic apparatus comprising a radio transmitter of a phase modulation type supplied with power from a power supply of a switching type, wherein the switching frequency of the power supply coincides with the comparison frequency of the PLL of the radio transmitter.

According to yet another aspect of the invention, there is provided an electronic apparatus comprising a radio transmitter of a phase modulation type supplied with power from a power supply of a switching type, wherein the switching frequency of the power supply is shifted a predetermined value from the comparison frequency of the PLL of the radio transmitter.

According to a further aspect of the invention, there is provided an electronic apparatus comprising a radio transmitter of a phase modulation type supplied with power from a power supply of a switching type, wherein the frequency to which the comparison frequency of the PLL of the radio transmitter is shifted, by a predetermined value, is determined in accordance with the cutoff frequency of a low-frequency filter incorporated in the PLL included in the oscillation circuit of the radio transmitter.

According to a still further aspect of the invention, there is provided an electronic apparatus comprising a radio transmitter of a phase modulation type supplied with power from a power supply of a switching type, and power frequency switching means whereby, as long as the radio transmitter is not used, the power is not supplied from the power supply to the circuit of the radio transmitter but the switching frequency of the power supply is preset to a predetermined frequency.

With the configuration described above, the effect of the switching noise of the power supply on the radio transmitter is reduced.

BRIEF DESCRIPTION OF THE DRAWINGS

FIGS. 3A to 3C show voltage waveforms generated at the respective parts of the PLL circuit of the radio unit circuit shown in FIG. 2, wherein

DESCRIPTION OF THE PREFERRED EMBODIMENTS

Embodiments of the invention will be described below with reference to the accompanying drawings.

Figure 1:
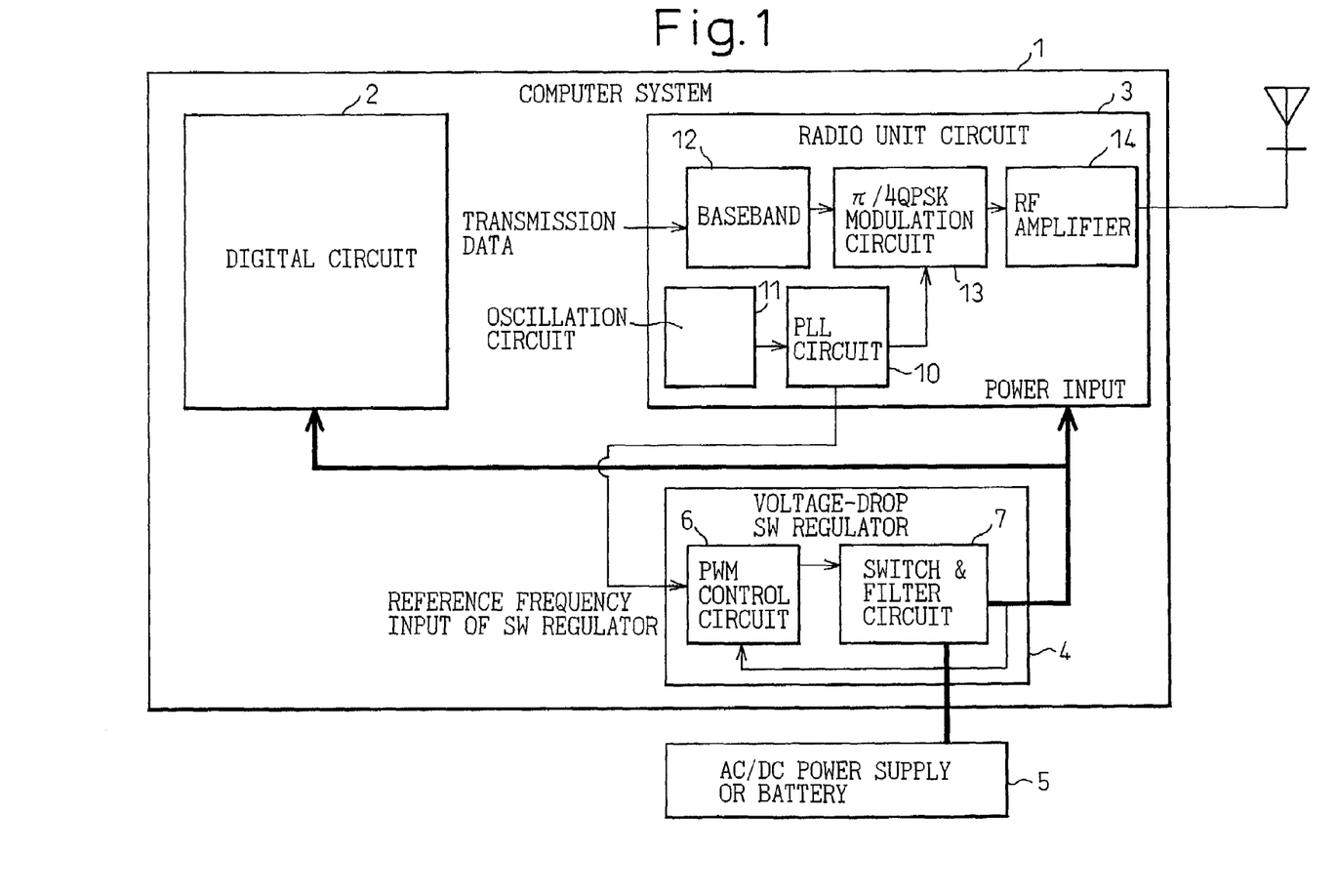
FIG. 1 is a block diagram showing a configuration of an electronic apparatus comprising a radio transmitter supplied with power from a switching (SW) regulator according to an embodiment of the invention.

FIG. 1 is a block diagram showing a configuration of an electronic apparatus comprising a radio transmitter supplied with power from a switching regulator according to an embodiment of the invention. In the case where the radio transmitter (hereinafter referred to simply as a "radio unit") built in the computer system 1 shown in FIG. 1 is not used, a digital circuit 2 including a low-frequency logic circuit of the computer system is turned on. In the case where the radio unit is used, on the other hand, a radio unit circuit 3 mainly including a high-frequency circuit of the radio unit is also turned on.

The switching regulator 4 providing a power supply receives power from an AC/DC power supply or a battery 5 and supplies a stable DC voltage to the digital circuit 2 and the radio unit circuit 3 through a PWM control circuit 6 and a switching & filter circuit 7.

The PWM control circuit 6 is for controlling the pulse width of the output pulse of the reference frequency generated usually from a built-in transmission circuit (not shown) based on a reference voltage. According to this embodiment of the invention, the output pulse is supplied from the radio unit circuit 3. The switching & filter circuit 7 generates a pulse train by switching the DC voltage output supplied from the power supply 5, through the switching element, and averages the switched pulse train through a LC filter. The voltage from the output of the switching & filter circuit 7 is fed back to the PWM control circuit 6, which in turn controls the pulse width in such a manner as to eliminate the difference between the feedback voltage and a voltage corresponding to the output pulse supplied from the radio unit circuit 3, with the result that the switching & filter circuit 7 supplies a stable DC voltage to the digital circuit 2 and the radio unit circuit 3.

The radio unit circuit 3 includes a PLL circuit 10, an oscillation circuit 11, a baseband circuit 12, a $\pi/4$ QPSK modulation circuit 13 and a RF (radio frequency) amplifier 14. Upon receipt of the transmission data from the digital circuit section of the computer system, the baseband circuit 12 of the radio unit circuit 3 generates a low-frequency baseband signal providing the base of the modulated wave and applies the particular signal to the $\pi/4$ QPSK modulation circuit 13.

On the other hand, the PLL (phase locked loop) circuit 10 receives a first input signal of a high base frequency from the oscillation circuit 11, smooths, in a LPF (low-pass filter), the voltage obtained from the phase difference between the first input signal and a second input signal fed back from a built-in VCO (voltage controlled oscillator) and, by controlling the VCO with the smoothed voltage, renders the output frequency of the VCO to coincide with the average frequency of the first input signal.

The $\pi/4$ QPSK (quadrature phase shift keying) circuit 13 modulates the phase of the output signal of the PLL circuit providing a carrier in accordance with the output signal of the baseband circuit 12 and transmits the modulated signal to the RF amplifier 14. This phase modulation is for transmitting the four-phase information of a sinusoidal wave by shifting $\pi/4$ each time and therefore is called the "$\pi/4$ QPSK".

The RF amplifier 14, which receives the signal phase-modulated by the $\pi/4$ QPSK signal, amplifies and outputs it by radio.

The relation between the ripple noise received by the radio transmitter of phase modulation type from the switching regulator and the reference frequency of the switching regulator will be explained below with reference to FIGS. 2 to 4.

Figure 2:
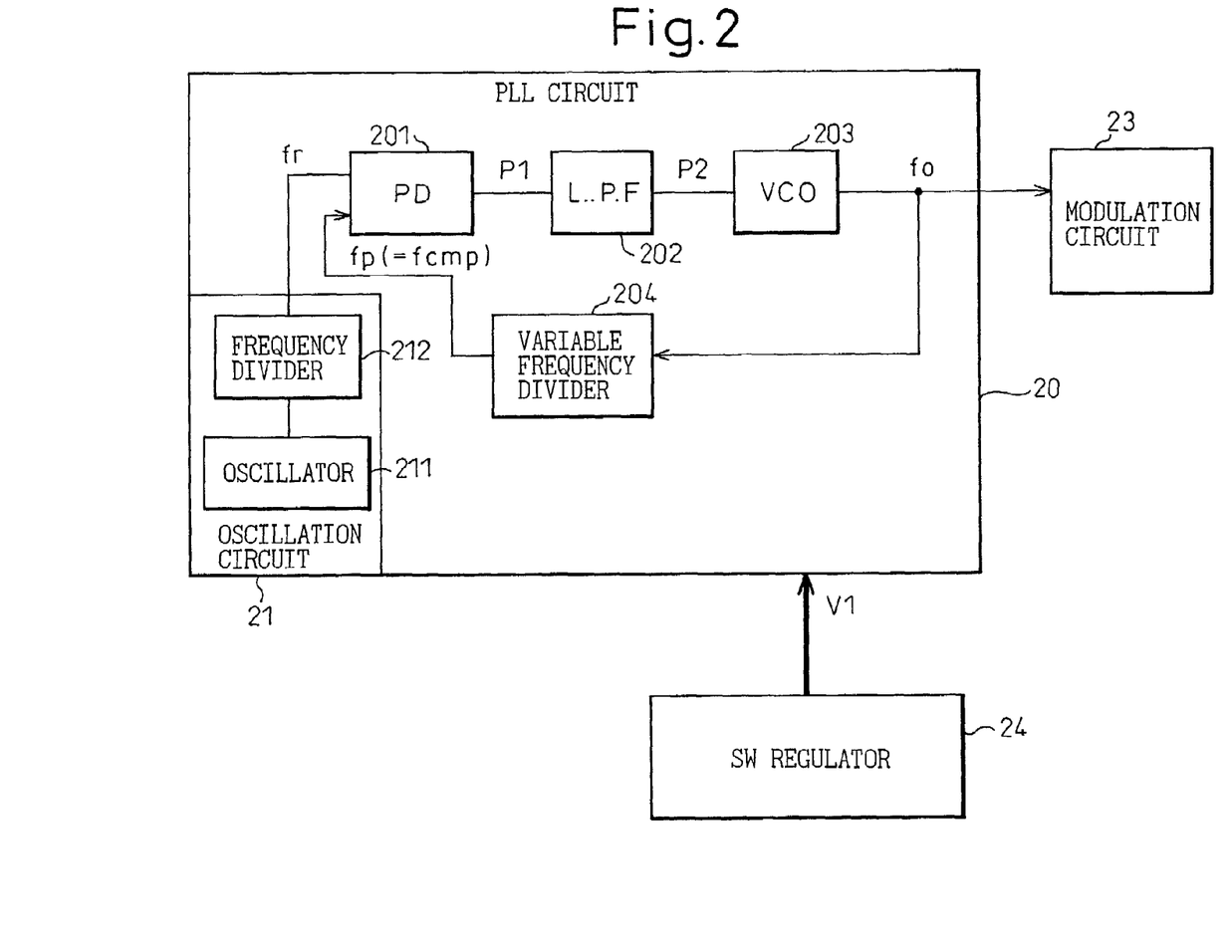
FIG. 2 is a diagram showing a specific example of a PLL circuit of an ordinary radio unit circuit.

FIG. 2 is a diagram showing a specific example of the PLL circuit of an ordinary radio unit circuit. The PLL circuit 20 receives a first input signal fr of the base radio frequency from the oscillation circuit 21. The PLL circuit 20 and the oscillation circuit 21 are supplied with a DC voltage V1 from the switching regulator 24.

The oscillation circuit 21 includes an oscillator 211, of high stability, formed of a crystal having a natural frequency and a frequency divider 212 for dividing the output frequency of the oscillator 211. The PLL circuit 20 includes a PD (phase detector) 201, a LPF 202, a VCO 203 and a variable frequency divider 204.

The PD 201 always compares the phase difference between a first input signal fr from the frequency divider 212 with a second input signal fp fed back from the VCO 203, and outputs the resulting voltage p1 to the LPF 202. The LPF 202 smooths the output voltage p1 from the PD 201. The VCO 203 outputs a signal oscillating at a frequency corresponding to the smoothing voltage p2. The output signal fo is input to the modulation circuit 23 while at the same time being fed back to the PD 201 as the second input signal fp through the variable frequency divider 204. The variable frequency divider 204 controls the second input signal fp in such a manner that the frequency of the output signal fo of the VCO 203 coincides with the average frequency of the first input signal fr output from the frequency divider 212 to the PD 201. The switching regulator 24 supplies a stable DC voltage V1 to the radio unit circuit including the PLL circuit 20 using the output pulse generated by a built-in high frequency oscillation circuit (not shown) as a reference frequency.

Figure 3A:
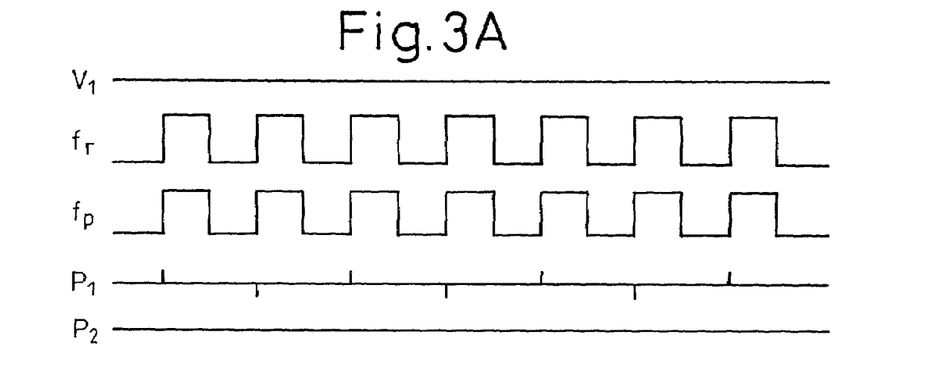
FIG. 3A shows voltage waveforms in the absence of a power noise.
Figure 3B:
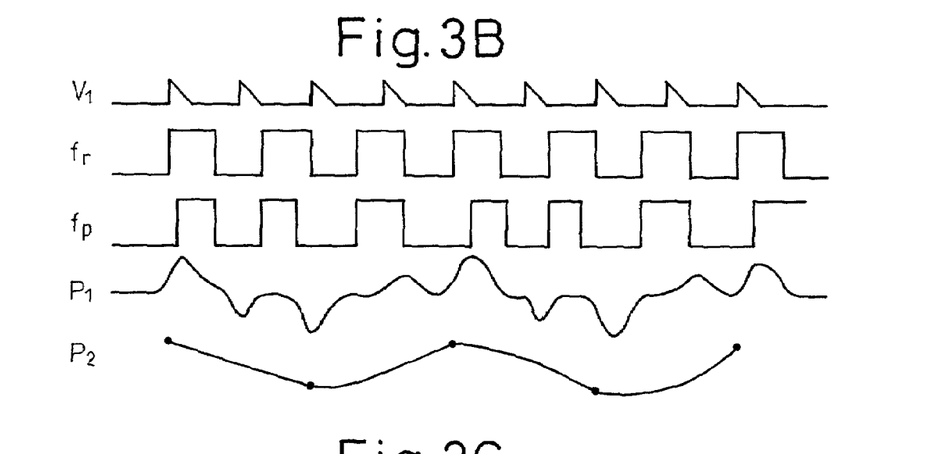
FIG. 3B shows voltage waveforms generated in the case where the power noise frequency is approximate to the comparison frequency.
Figure 3C:
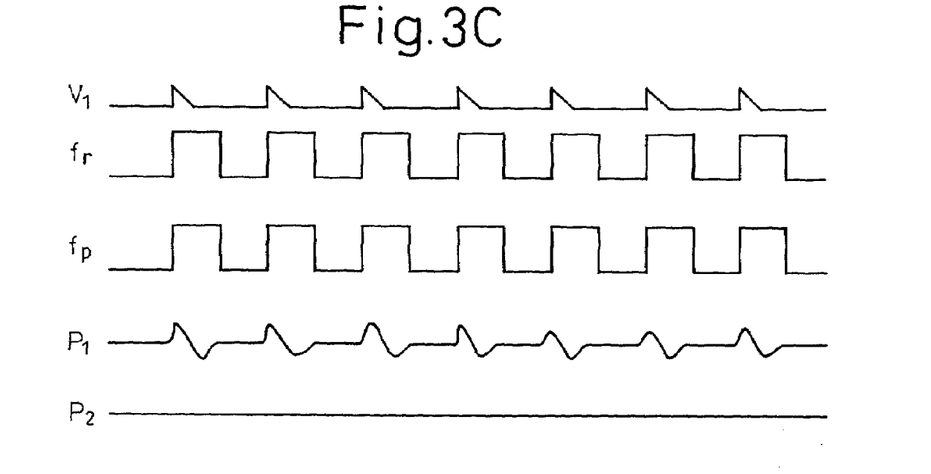
FIG. 3C shows voltage waveforms generated in the case where the power noise frequency coincides with the comparison frequency.

FIG. 3 is a diagram showing the voltage waveforms generated at the respective parts of the PLL circuit of the radio unit circuit shown in FIG. 2. In FIG. 3, (A) shows voltage waveforms in the absence of a power noise, (B) voltage waveforms generated in the case where the power noise frequency is approximate to the comparison frequency, and (C) voltage waveforms generated in the case where the power noise frequency coincides with the comparison frequency. With reference to both FIGS. 2 and 3, the effect of the power noise on the PLL circuit of the radio unit circuit will be explained below.

In FIG. 2, character fr designates a first input signal, character fp a second input signal, character p1 an error output signal of the PD 201, character p2 an output signal of the LPF 202, and character V1 a voltage signal of the switching regulator. FIG. 3 shows the chronological change of these voltage waveforms. In the case where no noise is generated in the source voltage signal V1, as seen from (A) of FIG. 3, only a small beat is generated in the error output signal p1 of the PD 201, and therefore the output signal p2 of the LPF 202 is not affected by the noise.

In the case where noise is generated in the source voltage signal V1 and the power noise frequency is approximate to the comparison frequency fp, as shown in (B) of FIG. 3, a beat is generated in the error output signal p1 of the PD 201, and therefore it is seen that the output signal p2 of the LPF 202 is affected by the noise.

Even when noise is generated in the source voltage signal V1, and the power noise frequency coincides with the comparison frequency fp, the power noise is canceled by the signal fed back from the VCO 203, so that no beat is generated in the error output signal p1 of the PD 202. It is thus seen that the output signal p2 of the LPF 202 is not affected by the noise.

Now, an explanation will be given of the modulation accuracy of the radio transmitter of a phase modulation type affected by the ripple noise of the switching regulator.

Figure 4:
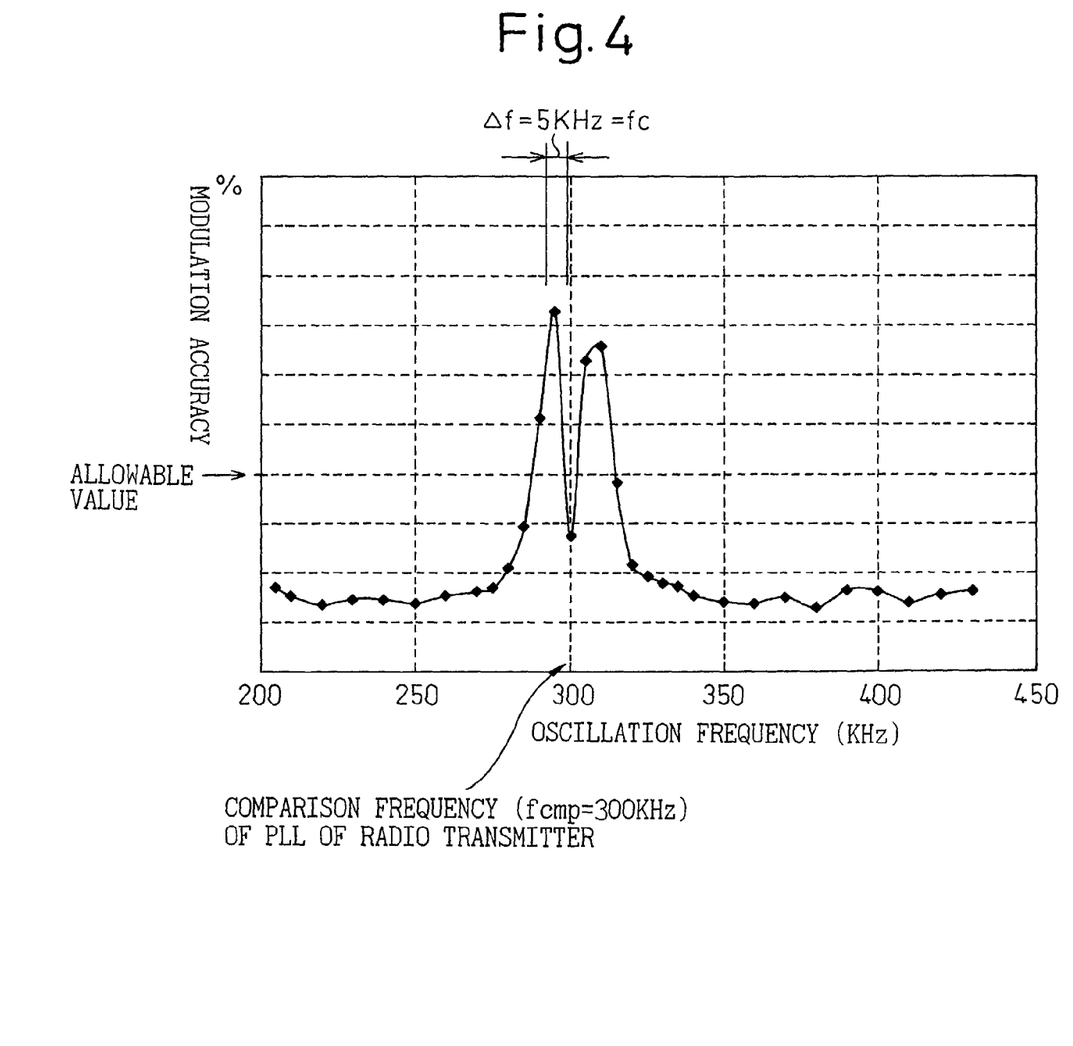
FIG. 4 is a diagram showing the modulation accuracy characteristic against the power ripple frequency of the radio transmitter of phase modulation type.

FIG. 4 is a diagram showing the characteristic of the modulation accuracy with respect to the power ripple frequency of the radio transmitter of a phase modulation type. FIG. 4 shows the result of actual measurement of the modulation accuracy of the PLL on the assumption that the comparison frequency fcmp is 300 KHz for sampling in the PLL circuit and the LPF (low-pass filter) cutoff frequency fc associated with the shift $\Delta f$ from the comparison frequency fcmp is 5 KHz in FIG. 2. The modulation accuracy is defined as a relative value of the phase shift amount resulting from the phase modulation in the radio unit circuit, and is indicated as 0% in the ideal case in which the phase shift amount is zero.

It is seen from the characteristic shown in FIG. 4 that the following features exist in the relation between the comparison frequency fcmp for sampling in the PLL and the power noise input to the radio unit circuit.

(1) In the case where the power noise of a frequency shifted by $\pm\Delta f$ from the comparison frequency fcmp for sampling in the PLL is input to the radio unit circuit, the value $\Delta f$ associated with the most deteriorated modulation accuracy coincides with the cutoff frequency fc of the loop filter of the PLL.

(2) In the case where the comparison frequency fcmp for sampling in the PLL coincides with the frequency of the power noise input to the radio unit circuit, the deterioration of the modulation accuracy can be reduced.

(3) In the case where the power noise of a frequency shifted by $\pm\Delta f\times 4$ or more from the comparison frequency fcmp for sampling in the PLL is input to the radio unit circuit, the deterioration of the modulation accuracy thereof can be reduced to a substantially ignorable level.

Utilizing these features, the reference frequency of the switching regulator providing a power supply for the radio transmitter of phase modulation type is set to a value avoiding the bandwidth fcmp $\pm\Delta f$. Then, the modulation accuracy of the radio unit is determined within an allowable value. Without using a ripple filter, therefore, an efficient switching regulator becomes readily available.

An embodiment of the invention in which the reference frequency applied to the switching regulator 4, shown in FIG. 1, is retrieved from the PLL circuit 10 of the radio unit circuit 3 will be explained below with reference to FIGS. 5 to 7.

Figure 5:
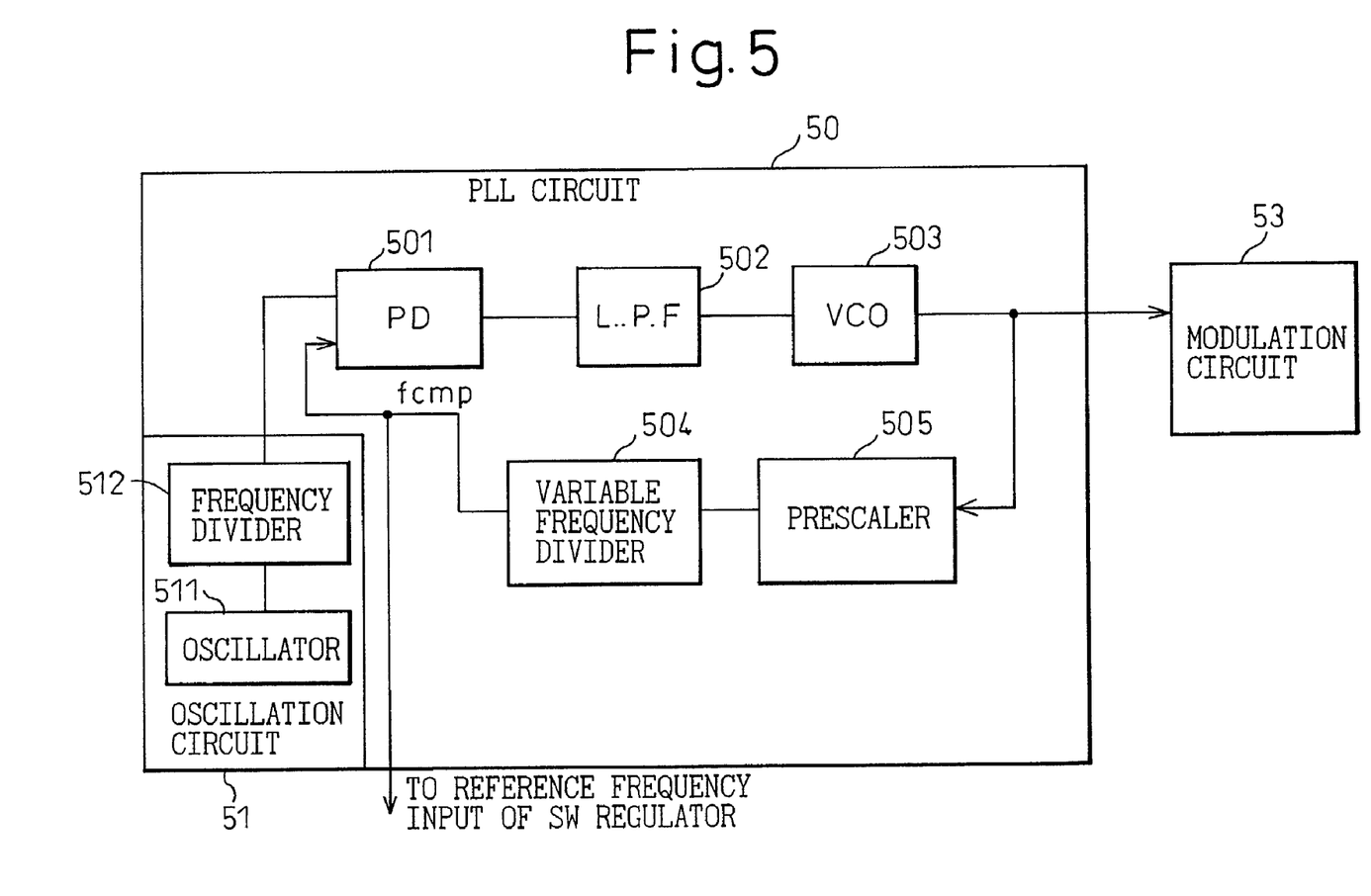
FIG. 5 is a diagram showing a PLL circuit for retrieving a reference frequency to be supplied to the switching regulator shown in FIG. 1 according to a first embodiment of the invention.

FIG. 5 is a diagram showing the PLL circuit for producing the reference frequency to be applied to the switching regulator of FIG. 1 according to a first embodiment of the invention. The PLL circuit 50 shown in FIG. 5 has the same component elements as the PLL circuit 20 shown in FIG. 2, except that a prescaler 505 is added between the VCO and the variable frequency divider. The prescaler 505 is a preliminary frequency divider whereby the output frequency of the VCO 503, if high, is reduced to a level divisible by the variable frequency divider 504.

According to the first embodiment utilizing the feature (2) above, the comparison frequency fcmp (=300 KHz) of the PLL circuit 50 used for the radio transmitter of phase modulation type is retrieved and the output thereof is used as a reference frequency of the switching regulator.

With this configuration, the frequency of the power noise exactly coincides with the comparison frequency fcmp of the PLL, and the deterioration of the modulation accuracy of the PLL circuit 50 can be prevented without removing the power noise in its entirety by use of a power noise ripple filter.

Figure 6:
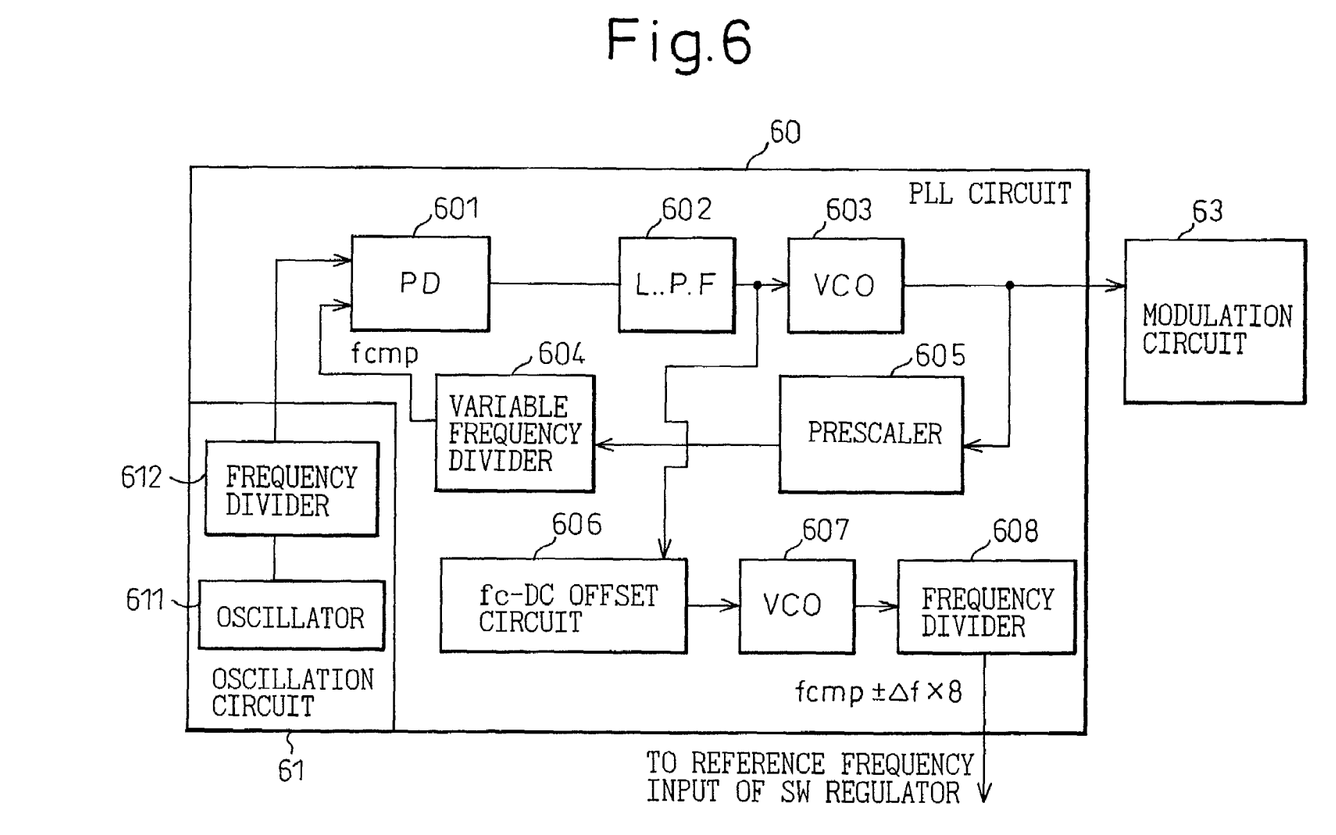
FIG. 6 is a diagram showing a PLL circuit for retrieving a reference frequency to be supplied to the switching regulator shown in FIG. 1 according to a second embodiment of the invention.

FIG. 6 is a diagram showing the PLL circuit for retrieving the reference frequency to be applied to the switching regulator of FIG. 1 according to a second embodiment. In this second embodiment, utilizing the feature (3) described above, the output signal of a frequency (=280 KHz or 320 KHz) shifted a predetermined value ($\pm\Delta f\times 4$) from the comparison frequency fcmp (=300 KHz) of the PLL circuit 60 used for the radio transmitter of phase modulation type is used as a reference signal of the switching regulator.

In this configuration, the area where the modulation accuracy is most deteriorated (the cutoff frequency ($\pm\Delta f\times 4$) of the LPF (low-pass filter)) in the comparison frequency of the PLL circuit is not included in the power noise. Without removing the power noise completely by a ripple filter, therefore, the modulation accuracy of the PLL circuit 60 can be prevented from deterioration.

According to the second embodiment, a PLL circuit is so configured that a frequency shifted from the comparison frequency of the PLL circuit to the frequency band free of deterioration of the modulation accuracy, from the comparison frequency of the PLL circuit 60, is produced as the reference frequency of the switching regulator. For this purpose, the PLL circuit 60 includes an fc-DC offset circuit 606 for adding an output voltage of the LPF 602 with a DC offset voltage corresponding to a frequency offset to the comparison frequency (fcmp) of the PLL circuit 60 in collaboration with the cutoff frequency (fc) of the LPF (low-pass filter) 602 of the PLL circuit 60, a VCO 607 providing a circuit adapted to oscillate in accordance with the result of addition in the fc-DC offset circuit 606, and a frequency divider 608. The cutoff frequency fc of the LPF 602 is 5 KHz. In the case where the cutoff frequency fc of the LPF 602 is 5 KHz and the difference between the power noise frequency and the comparison frequency fcmp is not lower than the cutoff frequency fc, therefore, the power noise is absorbed into the LPF 602. Thus, by setting the reference frequency of the switching regulator to a sufficiently low level as compared with fcmp−fc or a sufficiently high level as compared with fcmp+fc, the PLL 60 is not affected by the power noise. As a result, the frequency divider 608 is assumed to output a frequency signal of fcmp ±Δf×8 (=260 KHz or 340 KHz).

This configuration eliminates the need of readjustment even in the case where a change in the radio characteristics or the like changes the LPF characteristics of the PLL and, hence changes the frequency region, deteriorate the modulation accuracy.

Figure 7:
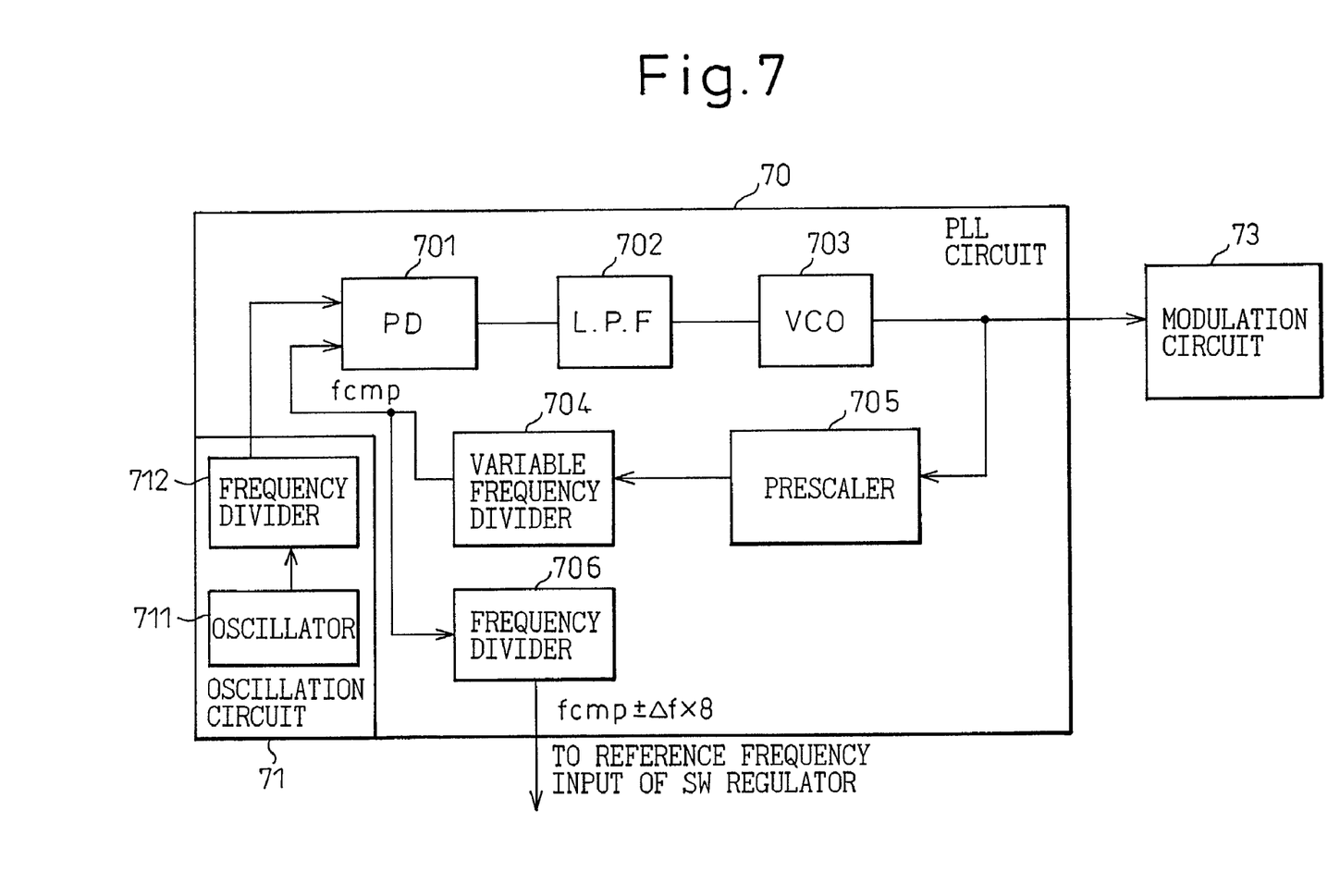
FIG. 7 is a diagram showing a PLL circuit for retrieving a reference frequency to be supplied to the switching regulator shown in FIG. 1 according to a third embodiment of the invention.

FIG. 7 is a diagram showing a PLL circuit for producing the reference frequency supplied to the switching regulator of FIG. 1 according to a third embodiment. In this third embodiment, the output of the comparison frequency of the PLL is realized by a frequency divider circuit as a method of acquiring, as a reference frequency of the switching regulator, a frequency shifted from the comparison frequency of the PLL circuit 70 to a value where the modulation accuracy is not deteriorated.

According to the third embodiment, a PLL circuit 70 is configured of a frequency divider 706 for acquiring, as a reference signal of the switching regulator, a frequency equivalent to the comparison frequency of the PLL circuit 70 shifted to a frequency band where the modulation accuracy is not deteriorated. The frequency divider 706 is assumed to output a frequency signal of fcmp×½(=150 KHz).

Now, other embodiments of the invention will be described.

The computer system 1 shown in FIG. 1 having a radio transmitter of phase modulation type built therein further comprises a change-over switch for determining whether the radio transmission circuit 3 is to be used or not. In the case where the radio transmission circuit 3 is used, power is supplied to the circuit of the radio transmitter from the switching regulator 4, whereas in the case where the radio transmission circuit 3 is not used, power is not supplied to the circuit of the radio transmitter from the switching regulator 4 but the switching frequency of the switching regulator 4 is set to a predetermined frequency level.

It will thus be understood from the foregoing description that according to this invention, there is provided an electronic apparatus having a radio transmitter of a phase modulation type or, for example, a computer system such as a personal computer having a radio transmitter built therein, wherein the reduction in the phase modulation accuracy of the radio transmitter can be kept free of the effect of the power noise generated from a switching regulator of high power efficiency without any ripple filter for preventing power noises or without changing over the switching frequency of the switching regulator.

Also, according to this invention, there is provided a compact, inexpensive electronic apparatus in which a physical space for a PLL circuit can be easily secured in view of the fact the PLL circuit, unlike the ripple filter, can be readily provided in the form of a LSI.

What is claimed is:

1. An electronic communication apparatus, comprising:
   a phase modulation radio transmitter, comprising:
      a phase lock loop (PLL) circuit having an oscillation circuit and a phase detection circuit receiving a first input signal from the oscillation circuit and a second input signal from the output of the PLL circuit, the second input signal having a comparison frequency;
      a modulation circuit receiving the signal output from the PLL circuit; and
   a switchable power supply supplying power to the PLL circuit, the switchable power supply having a switching frequency which is equal to the comparison frequency of the second input signal.

2. The electronic communication apparatus according to claim 1, further comprising power frequency switching means for preventing said power from being supplied to the circuit of said radio transmitter and setting the switching frequency of said power supply to a predetermined value in the case where said radio transmitter is not used.

\* \* \* \* \*